United States Patent
Hart et al.

(10) Patent No.: US 6,795,896 B1
(45) Date of Patent: Sep. 21, 2004

(54) METHODS AND APPARATUSES FOR REDUCING LEAKAGE POWER CONSUMPTION IN A PROCESSOR

(75) Inventors: Frank Hart, Apex, NC (US); Edwin J. Pole, II, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 09/676,149

(22) Filed: Sep. 29, 2000

(51) Int. Cl.[7] .............................................. G06F 12/00
(52) U.S. Cl. ...................... 711/118; 711/141; 713/324
(58) Field of Search .............................. 711/118, 141; 713/324

(56) References Cited

U.S. PATENT DOCUMENTS

| | | | | |
|---|---|---|---|---|
| 5,530,673 A | * | 6/1996 | Tobita et al. | 365/185.09 |
| 5,632,038 A | * | 5/1997 | Fuller | 711/144 |
| 5,666,537 A | * | 9/1997 | Debnath et al. | 713/322 |
| 5,708,768 A | * | 1/1998 | Horiuchi et al. | 345/471 |
| 5,748,874 A | * | 5/1998 | Hicksted et al. | 714/24 |
| 5,761,406 A | * | 6/1998 | Kobayashi et al. | 711/112 |
| 5,809,532 A | * | 9/1998 | Eno et al. | 711/141 |
| 5,862,083 A | * | 1/1999 | Tobita et al. | 365/185.09 |
| 5,913,223 A | * | 6/1999 | Sheppard et al. | 711/118 |
| 5,931,951 A | * | 8/1999 | Ando | 713/324 |
| 5,973,964 A | * | 10/1999 | Tobita et al. | 365/185.29 |
| 6,078,520 A | * | 6/2000 | Tobita et al. | 365/185.09 |
| 6,105,141 A | * | 8/2000 | Hanlon et al. | 713/323 |
| 6,275,436 B1 | * | 8/2001 | Tobita et al. | 365/221 |
| 6,347,379 B1 | * | 2/2002 | Dai et al. | 713/320 |

\* cited by examiner

*Primary Examiner*—Kevin Verbrugge
(74) *Attorney, Agent, or Firm*—Blakely, Sokoloff, Taylor & Zafman LLP

(57) ABSTRACT

A method of reducing power leakage consumption in a processor by shutting off power to the cache memory when the processor is idle. The contents of the cache memory are written to a low leakage memory such as SDRAM or main memory. The power to the cache memory is then cut off and remains off until the occurrence of a system event. While power to the cache memory remains off, the cache memory interface is left operational so that the portion of the cache memory image stored in other memory is marked invalid if the corresponding data in main memory has been modified.

Upon the occurrence of the system event the cache memory contents are automatically restored to the cache memory within a specified time.

16 Claims, 2 Drawing Sheets

METHODS AND APPARATUSES FOR REDUCING LEAKAGE POWER CONSUMPTION IN A PROCESSOR

FIELD OF THE INVENTION

The present invention relates generally to reducing the leakage power consumption of high performance processors, and more specifically to reducing leakage power consumption by shutting off power to the cache memory.

BACKGROUND

The need for reducing the power consumption of computers is especially keen for battery-operated systems such as laptops or notebook personal computers. Because the power source of mobile computers accounts for a significant percentage of the bulk and weight of the device, attempts have been made since the advent of laptops to reduce their power consumption. One way of reducing power consumption is to stop the clock input to the processor when the processor is inactive. This method saves significant power since the clock logic is a major power consumer of the processor.

Another area of power consumption that has become more significant recently is leakage power consumption. Leakage power consumption is inherent in semiconductor physics and is a product of the design methods used to create high speed processors. Leakage power consumption is caused by a voltage gradient across a junction within a semiconductor chip that causes current flow. The development of high performance processors has also meant increased leakage power consumption because higher frequency devices employ smaller transistors in larger numbers than ever before. The smaller the transistor channel length and oxide thickness the greater the leakage power consumption.

A significant amount of leakage power consumption could be avoided by cutting the power supply to as much of the CPU as possible when the CPU is not being used. It is desirable, of course, that this power interruption be transparent to the user and comply with design specifications of commercial software developers.

BRIEF DESCRIPTION OF THE DRAWINGS

The present invention is illustrated by way of example and not limitation in the figures of the accompanying drawing, in which like references indicate similar elements and in which.

DETAILED DESCRIPTION

Figure 1:
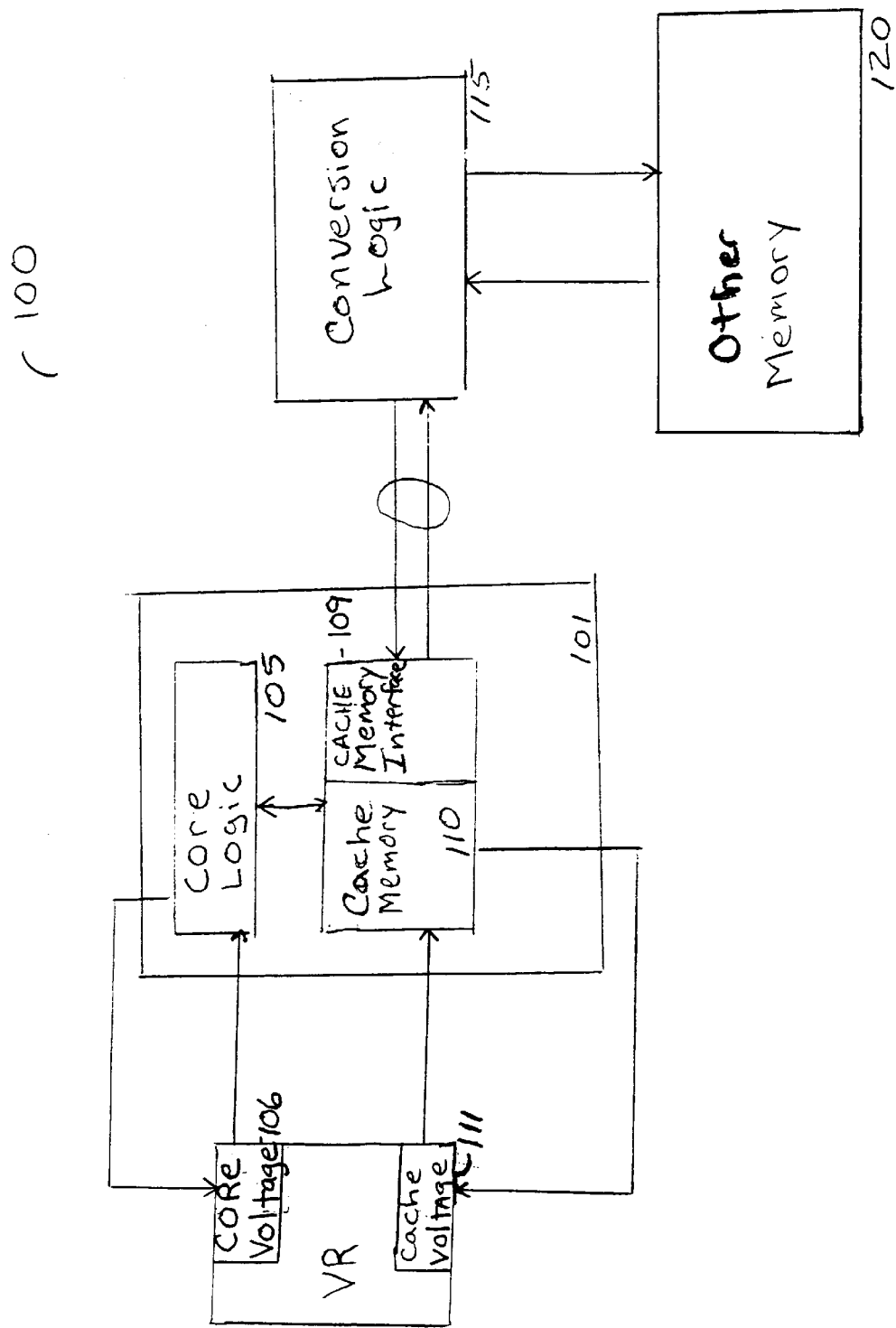
FIG. 1 is a block diagram of a system in accordance with one embodiment of the present invention.

FIG. 1 is a block diagram of a system according to one embodiment. The system 100 shows processor 101, containing core logic 105 coupled to cache memory 110. The core logic 105 and the cache memory 110 make up the two main components of a processor. In one embodiment, the cache memory 110 is connected to conversion logic 115 through the cache memory interface 109. The conversion logic 115 is coupled to other memory 120 that could be a memory device such as SDRAM or could be other memory. Also shown in FIG. 1 is the core voltage 106 and the cache voltage 111. The size of cache memory 110 may typically be 256K bytes with 8 K bytes of tag memory used for the address referencing. The cache memory 110 is comprised of densely packed transistors and is therefore, typically, the source of more leakage power consumption than the core logic 105. When the processor is not in use, cache voltage 111 can be cut to the cache memory 110 thereby reducing leakage power consumption. First the contents of the cache memory 110 are stored in less leaky memory. Core voltage 106 remains active.

Figure 2:
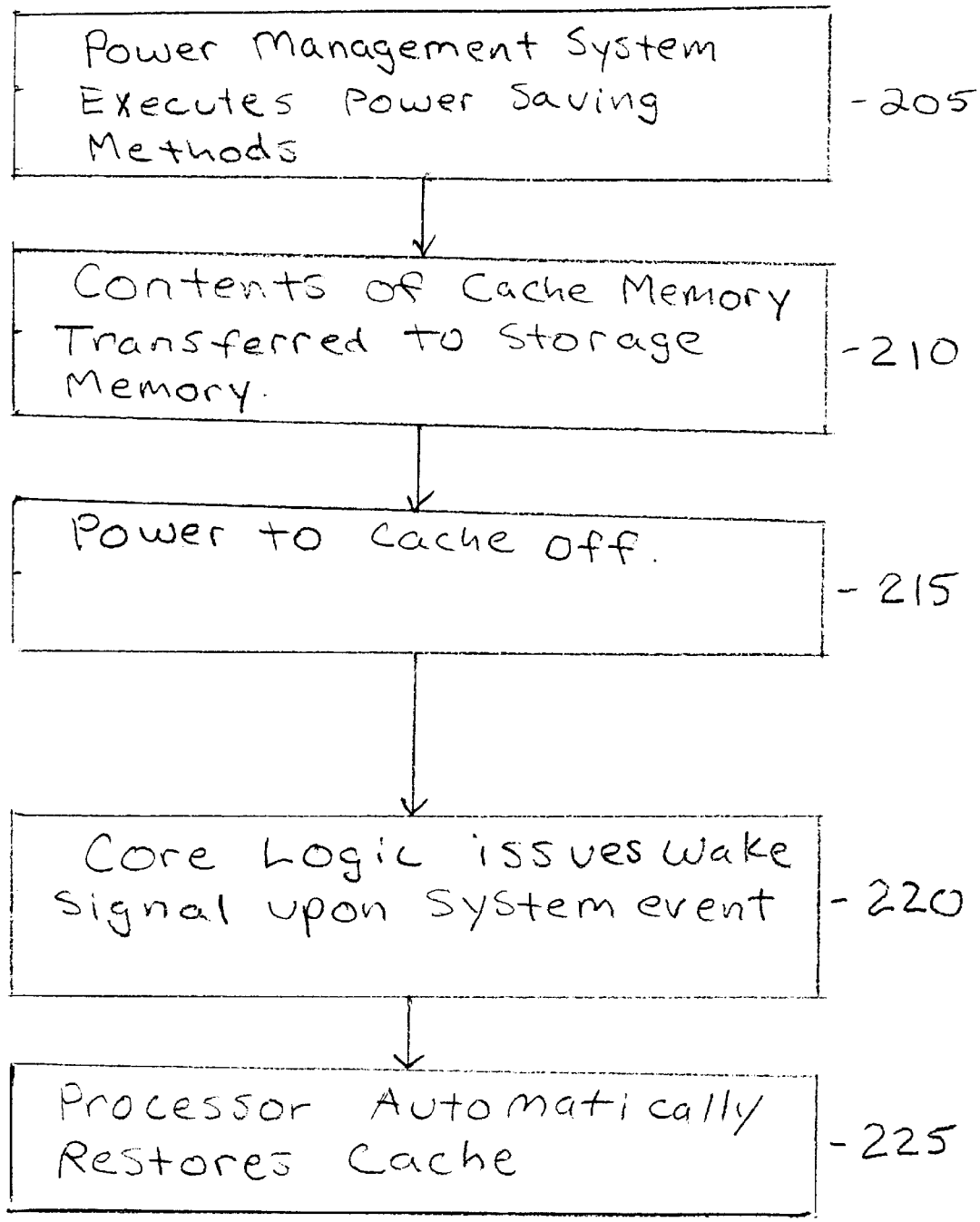
FIG. 2 is a flow diagram of the method of one embodiment of the present invention.

FIG. 2 is a process flow diagram of one embodiment of the present invention. The process of FIG. 2 begins at operation 205 in which a power management system executes power saving methods. The computer's operating system uses a power measurement policy to determine if the system is active or not. If the system is not active the operating system calls a piece of code, written by the computer manufacturer, that dictates what is to be done when the system is not busy. One of the instructions may be to initiate power saving schemes. In operation 210, at least part of the contents of the cache memory are transferred via the cache memory interface 109 through conversion logic 115 to memory 120. Memory 120, with a frequency of, for example 143 Mhz for a SDRAM device or 200 Mhz for main memory, is typically much slower than cache memory 110. The content transfer from cache memory 110 to memory 120 takes place at a rate that memory 120 can accommodate.

Once the transfer is complete, the power to the cache 110 can be cut off. At this point leakage power consumption is reduced and power is being saved. Slower memory 120 leaks less power than the faster cache memory because the slower memory is fabricated with less advanced process technology. The cache memory is a local faster version of main memory in that the cache memory holds a copy of some portions of main memory. When a portion of main memory that is also stored in cache memory is modified, the content in the cache memory typically will be modified, as well, or labeled invalid. This prevents a device from reading erroneous data from cache. Once the power is cut to the cache memory the data stored there is no longer valid. A problem arises because the rest of the system is unaware that the cache memory has been shut down and a peripheral device may try to read the contents from the cache.

In one exemplary embodiment the cache memory interface 109 is left on so that when a snoop cycle is run it goes through the cache memory interface 109. The portion of the cache memory image that is stored in other memory 120 is marked invalid using means implemented in other memory 120. The system is now aware that the data stored in the cache memory 110 is no longer representative of what is stored in main memory. This provides coherency without having to restore the power to the cache memory 110.

At operation 220, the core logic 105 issues a wake signal upon some system event. Such an event could be a keystroke, a mouse input, or something happening in the system that indicates that the cache must be used. In one embodiment, an interrupt may be a wake signal causing the contents of cache memory 110 to be restored as described below in reference to operation 225.

At operation 225 the processor automatically restores the power and content to the cache memory 110 using the reverse process of process 210. For commercially practical reasons the restoring of the cache memory content must be accomplished within a specified time. Software vendors maintain platform performance metric specifications for their operating systems. These criteria dictate that from the time the hardware indicates a need for a certain action, it can be no more than a specified period of time before the operating system has control to effect the hardware commands. For example, a software producer may specify 1 millisecond as the maximum allowable time for hardware to respond to some operating system event in a particular product. This means that upon a system event the cache content must be restored within 1 ms. The determinative factors in restoring the cache are the cache size, and the width and transfer rate of the storage memory. For example, for a typical cache size of 256 K bytes with 8 K bytes of tag, and a typical 16-bit transfer bus, using synchronous dynamic random access memory (SDRAM) with a frequency of 143 Mhz the transfer can be completed in 945 microseconds just under a 1 ms specification). Larger cache sizes could be transferred within a given specified time by using a faster storage memory, such as main memory, which may have a speed of 200 Mhz or more. Larger cache sizes could also be accommodated by using a wider transfer bus. The scope of the invention includes any combination of bus size, cache size, or memory speed. The cache memory could also be static random access memory (SRAM), rambus dynamic random access memory (RDRAM), or other similar memory.

The process of the present invention may be implemented through use of a machine-readable medium which includes any mechanism that provides (i.e. stores and/or transmits information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    upon a determination of system inactivity, copying via a cache memory interface associated with a processor cache memory, a portion of the contents of a the processor cache memory that can be restored to the processor cache memory within a specified time to a lower leakage storage memory, the processor cache memory a component of a processor;
    shutting off power to the processor cache memory, while maintaining power to the cache memory interface;
    restoring power to the processor cache memory upon a system event; and
    automatically restoring the contents of the processor cache memory within the specified time by copying the copy of the portion of the contents of the processor cache memory from the lower leakage storage memory to the processor cache memory.

2. The method of claim 1, wherein the lower leakage storage memory is the system main memory.

3. The method of claim 1, wherein the lower leakage storage memory is locally attached to an autonomous subsystem.

4. The method of claim 3, wherein the lower leakage storage memory is selected from the group consisting of SDRAM, RDRAM, and SRAM.

5. The method of claim 1, wherein the system event is an interrupt.

6. The method of claim 1, wherein a cache size, a transfer bus width, and a transfer rate are determined based upon the specified time.

7. The method of claim 6, wherein the specified time is 1 millisecond.

8. The method of claim 1, further comprising:
    responding to snoop cycle by marking the appropriate cache line as invalid, such that coherency is maintained, without restoring power to the processor cache memory.

9. A machine-readable medium that provides executable instructions, which when executed by a processor, cause said processor to perform a method comprising:
    upon a determination of system inactivity, copying via a cache memory interface associated with a processor cache memory, a portion of the contents of the processor cache memory that can be restored to the processor cache memory within a specified time to a lower leakage storage memory, the processor cache memory a component of a processor;
    shutting off power to the processor cache memory, while maintaining power to the cache memory interface;
    restoring power to the processor cache memory upon a system event; and
    automatically restoring the contents of the processor cache memory within the specified time by copying the copy of the portion of the contents of the processor cache memory from the lower leakage storage memory to the processor cache memory.

10. The machine-readable medium of claim 9, wherein the lower leakage storage memory is the system main memory.

11. The machine-readable medium of claim 9, wherein the lower leakage storage memory is locally attached to an autonomous subsystem.

12. The machine-readable medium of claim 11, wherein the lower leakage storage memory is selected from the group consisting of SDRAM, RDRAM, and SRAM.

13. The machine-readable medium of claim 9, wherein the system event is an interrupt.

14. The machine-readable medium of claim 9, wherein a cache size, a transfer bus width, and a transfer rate are determined based upon the specified time.

15. The machine-readable medium of claim 14, wherein the specified time is 1 millisecond.

16. The machine-readable medium of claim 9, further comprising: responding to snoop cycle by marking the appropriate cache line as invalid, such that coherency is maintained, without restoring power to the processor cache memory.

* * * * *

UNITED STATES PATENT AND TRADEMARK OFFICE
CERTIFICATE OF CORRECTION

PATENT NO. : 6,795,896 B1  Page 1 of 1
DATED : September 21, 2004
INVENTOR(S) : Hart et al.

It is certified that error appears in the above-identified patent and that said Letters Patent is hereby corrected as shown below:

Column 3,
Line 47, after the second occurrence of "of", delete "a".

Signed and Sealed this

Tenth Day of May, 2005

JON W. DUDAS
*Director of the United States Patent and Trademark Office*